(12) United States Patent
Huckins

(10) Patent No.: US 6,752,978 B2
(45) Date of Patent: *Jun. 22, 2004

(54) METHOD FOR PRODUCING HYDROGEN PEROXIDE FROM HYDROGEN AND OXYGEN

(75) Inventor: Harold A. Huckins, Hilton Head, SC (US)

(73) Assignee: Advanced Peroxide Technology, Inc., Hilton Head, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 10/326,286

(22) Filed: Dec. 23, 2002

(65) Prior Publication Data

US 2003/0161783 A1 Aug. 28, 2003

Related U.S. Application Data

(63) Continuation of application No. 09/492,498, filed on Jan. 27, 2000, now abandoned, which is a division of application No. 08/783,881, filed on Jan. 16, 1997, now Pat. No. 6,042,804, which is a continuation-in-part of application No. 08/509,841, filed on Aug. 1, 1995, now Pat. No. 5,641,467, which is a continuation-in-part of application No. 08/291,437, filed on Aug. 16, 1994, now abandoned.

(51) Int. Cl.⁷ .............................................. C01B 15/01
(52) U.S. Cl. ...................................................... 423/584
(58) Field of Search ........................................ 423/584

(56) References Cited

U.S. PATENT DOCUMENTS

| 4,009,252 A | 2/1977 | Izumi et al. |
|---|---|---|
| 4,279,883 A | 7/1981 | Izumi et al. |
| 4,336,239 A | 6/1982 | Dalton, Jr. et al. |
| 4,336,240 A | 6/1982 | Moseley et al. |
| 4,347,232 A | 8/1982 | Michaelson |
| 4,661,337 A | 4/1987 | Brill |
| 4,681,751 A | 7/1987 | Gosser |
| 4,772,458 A | 9/1988 | Gosser et al. |
| 4,996,039 A | 2/1991 | Pralus et al. |
| 5,082,647 A | 1/1992 | Chuang |
| 5,104,635 A | 4/1992 | Kanada et al. |
| 5,169,618 A | 12/1992 | Maraschino |
| 5,194,242 A * | 3/1993 | Paoli ........................... 423/584 |
| 5,641,467 A * | 6/1997 | Huckins ...................... 423/584 |
| 6,042,804 A * | 3/2000 | Huckins ...................... 423/584 |

* cited by examiner

*Primary Examiner*—Wayne A. Langel
(74) *Attorney, Agent, or Firm*—Edell, Shapiro & Finnan

(57) ABSTRACT

The invention relates to a method and apparatus for safely producing hydrogen peroxide by injecting dispersed minute bubbles of hydrogen and oxygen into a rapidly flowing liquid medium. The minute bubbles are surrounded by the liquid medium of sufficient volume for preventing an explosive reaction between the hydrogen and oxygen. The liquid medium is formed of an acidic aqueous solution and a Group VIII metal catalyst. Hydrogen is sparged into the flowing medium for dissolution of the hydrogen in the medium. Oxygen bubbles are reacted with the dissolved hydrogen for producing hydrogen peroxide. Preferably, the liquid medium has a velocity of at least 10 feet per second for providing a bubbly flow regime in the reactor. The invention allows the direct combination of oxygen and hydrogen while preventing propagation of an explosive condition within the reactor. The method and apparatus provide for the safe production of hydrogen peroxide with low manufacturing costs.

12 Claims, 4 Drawing Sheets

BATCH-SEMI CONTINUOS OPERATION OF DIRECT HYDROGEN PEROXIDE PROCESS

METHOD FOR PRODUCING HYDROGEN PEROXIDE FROM HYDROGEN AND OXYGEN

CROSS REFERENCE TO RELATED APPLICATION

This application is a continuation of U.S. patent application Ser. No. 09/492,498, filed Jan. 27, 2000, now abandoned which is a divisional of U.S. patent application Ser. No. 08/783,881, filed Jan. 16, 1997, now U.S. Pat. No. 6,042,804, which was a continuation-in-part of U.S. patent application Ser. No. 08/509,841, filed Aug. 1, 1995, now U.S. Pat. No. 5,641,467, which was a continuation-in-part of U.S. application Ser. No. 08/291,437, filed Aug. 16, 1994 (abandoned).

BACKGROUND OF THE INVENTION

1. Field of the Invention

The present invention relates to a method and apparatus for producing hydrogen peroxide by injecting minute bubbles of hydrogen and oxygen into a liquid stream of an aqueous solution of water and an inorganic acid and a Group VIII metal catalyst in which the liquid stream flows at high velocity.

2. Description of the Related Art

It is known that a mixture of gaseous oxygen and gaseous hydrogen forms an explosive material. Virtually all currently produced hydrogen peroxide is produced by indirectly combining hydrogen and oxygen. Thus, the primary conventional industrial method for production of hydrogen peroxide uses a chemical agent first for the reduction or hydrogenation. Typically, alkylanthraquinone, such as ethyl or tertiary butyl anthraquinone, is used as the chemical agent. This working solution contains organic solvents such as di-isobutylcarbinol and methyl naphthalene. Oxidation of the intermediate product of the reduction reaction produces hydrogen peroxide and the original alkylanthraquinone. The anthraquinone is recycled back through the process. This method has the shortcoming that there is a considerable loss of the anthraquinone and the organic solvents from oxidation and thermal degradation of these organic materials. The presence of these organics with oxygen and hydrogen peroxide presents safety hazards from their potential reactions. This destruction of organics involves high operating losses for the currently practiced commercial process.

Various methods have been attempted to directly combine oxygen and hydrogen to overcome the above-described problems. The direct combination of hydrogen and oxygen to form hydrogen peroxide has the advantage of not requiring the use of any organic or combustible materials. The direct process, however, does require careful control of the gaseous mixture of oxygen and hydrogen so that they are always outside the explosive range.

There have been numerous patents issued for the direct combination of hydrogen and oxygen to produce hydrogen peroxide. U.S. Pat. Nos. 4,347,232 and 4,336,240 employ a two phase system through the use of organic compounds to form a second phase. However, the organics can react with oxygen or hydrogen peroxide to render these processes uneconomical.

Other patents employ a fixed bed catalyst within a reaction vessel which has low conversion per pass or low reactor productivity (see for example, U.S. Pat. Nos. 4,336,239 and 5,082,647).

U.S. Pat. No. 5,169,618 ('618 patent) to Marischino describes establishing a pulse-flow regime in a catalyst bed. The '618 patent has the limitation of low conversion of hydrogen peroxide per pass and high equipment costs.

U.S. Pat. No. 4,996,039 describes first absorbing hydrogen into the aqueous reaction mixture with a catalyst; dropping the pressure to remove all the hydrogen in the gas phase; and then introducing the oxygen in order to produce hydrogen peroxide. This technique minimizes the presence of hydrogen in the gaseous phase. This process is expensive to repressure the reactor with oxygen and doesn't lend itself to continuous processing.

Continuous modes of operation for the direct combination process have also been proposed, as disclosed in U.S. Pat. Nos. 4,009,252; 4,279,883; 4,681,751; and 4,772,458. These patents employ a catalyst as a slurry in an agitated reactor. These patents have the drawback of having either low conversion per pass or low volumetric efficiency either of which is uneconomical.

U.S. Pat. No. 4,661,337 ('337 patent) describes a process for direct combination for producing hydrogen peroxide of increased concentration. The volume of the reaction mixture occupies a small portion of the available volume of the reactor. It is taught in the '337 patent that the layer of reaction mixture has a thickness of no more that 2 millimeters. This patent has the disadvantage that the majority of the reactor is in the gas phase in which no hydrogen peroxide is formed.

In all the above described patents, there is a separate continuous gaseous phase in which it is necessary to inject an inert gas such as nitrogen, argon or helium in order to remain outside the explosive range of hydrogen and oxygen.

Other attempts for the direct formulation of hydrogen peroxide use liquid filled reactors without a continuous gas phase. U.S. Pat. No. 5,104,635 describes a liquid filled reactor with two internal membranes which each are permeable only for hydrogen and oxygen, respectively. This reaction system requires considerable capital for the use of the membranes.

U.S. Pat. No. 4,279,883 describes a process for preparing hydrogen peroxide in an aqueous medium. The aqueous medium contains dissolved hydrogen and a platinum-group catalyst having absorbed thereto hydrogen. Inert nitrogen and argon are blown into the aqueous medium so that no dissolved oxygen is present in the aqueous medium during the hydrogen absorbing treatment. Oxygen gas is injected into the medium after the absorption of the hydrogen on the catalyst and the gaseous zone and liquid zones are stirred. This patent has the shortcoming of requiring an injection of an inert gas into the reactor during the hydrogen absorption phase to prevent an explosion between the hydrogen and oxygen gases.

U.S. Pat. No. 5,194,242 ('242 patent) describes a process for preparing hydrogen peroxide in which an acidic aqueous solution fills an elongated reaction zone in a tubular reactor. A catalyst is provided to the reaction zone. Oxygen together with recycled gas and then hydrogen are dispersed into the solution in proportions that are above the lower flammability limit for hydrogen and oxygen and are maintained at a temperature and pressure until the reaction mixture has decreased to below the lower flammability limit for the hydrogen and oxygen mixture. The partial pressure of hydrogen and oxygen is super-atmospheric in the range of about 20 to about 400 psi. The aqueous solution flows through the reactor at liquid velocity at rate from about 4 to about 18 ft/sec.

In the '242 patent, the ratio of the flow of the aqueous medium to the aggregate flow of the hydrogen and oxygen is such that a gas phase regime of large elongated bubbles may be produced, which, if reacted violently would not be surrounded by sufficient liquid volume to cool the gas mixture, resulting in elevated temperature and pressure which can result in an explosion of the gas mixture. Patentees provide no teaching of the importance of operating in a regime in which small discrete individual bubbles exist which can be quenched by the surrounding medium. It is desirable to provide a safe direct combination process for producing hydrogen peroxide which has low manufacturing costs.

OBJECTS OF THE INVENTION

It is a primary object of the invention to provide a process for the reaction of oxygen and hydrogen which is efficient and safe.

It is a further related object of the invention to provide a process which operates in the flammable range of oxygen/hydrogen mixtures so as to benefit from increased reaction rate, without sacrificing the safety aspects of the process.

It is a further and related object of the invention to increase the molar ratio of gas (hydrogen and oxygen) relative to aqueous reaction solution in order to improve the space-time yield of the reactor system but without jeopardizing the safety of the reactor operation.

It is still a further related object of the invention to substantially completely react hydrogen during the process in order to maximize the efficiency of utilization of that expensive reactant.

It is still a further object of the invention to carry out the process with minute bubbles of hydrogen and oxygen supplied to the reaction zone at a rate and in such a way as to obviate the risk of explosion.

SUMMARY OF THE INVENTION

The invention comprises a method and apparatus for producing hydrogen peroxide in which hydrogen and oxygen are separately injected into a liquid filled reactor to form a plurality of discrete individual bubbles in a continuous rapidly flowing liquid stream. Each bubble is surrounded by a continuous liquid phase such that if the hydrogen and oxygen gas reacted, there is sufficient liquid available to quench/cool down the reaction in order to prevent an explosion propagating throughout the reactor. It has been found that it is critical to maintain the ratio of the volume of flow of aqueous medium to the aggregate volume of flow of hydrogen and oxygen, at a high value so as to avoid uncontrolled reaction of hydrogen and oxygen bubbles to form water. By controlling the ratio of the volume of flow of aqueous medium to the volume of flow of hydrogen and oxygen, both independently, and, in the aggregate, there is sufficient liquid volume present to quench any runaway reaction that might take place. It is also important to maintain the flow velocity of aqueous medium at at least ten feet per second to obtain a dispersed bubbly flow regime.

It has been found that the reaction can be safely and efficiently operated at higher levels of space-time yield if the reaction pressure is above 1200 psi. Preferably, the pressure is above 1500 psi. Most advantageously, it is from 2000 to 5000 psi.

Preferably, a pipeline reactor is used having a plurality of passes within the reactor. The pipeline reactor can be formed of a plurality of tubes arranged vertically or horizontally and connected with curved tubes (elbows). The liquid stream can be formed of water, a dilute acid and a Group VIII metal catalyst. The Group VIII metal catalyst can be platinum or palladium or a mixture of the two on an inert support such as alumina, silica or carbon. The liquid stream fills the reactor. Recycle gas containing hydrogen and oxygen is first injected into the flowing liquid stream. Fine dispersed hydrogen gas bubbles can then be dissolved into the flowing liquid stream. After the hydrogen is dissolved, finely dispersed oxygen gas bubbles are injected into the liquid stream for reacting with hydrogen to form hydrogen peroxide. After this first reaction is complete, multiple injections of first hydrogen and then oxygen can be used to raise the concentration of hydrogen peroxide produced to a predetermined level. The number of injections of hydrogen and oxygen bubbles can be varied for producing the desired concentration of the hydrogen peroxide.

It has also been found that the safety of the reaction system can be ensured if the reaction zone is comprised of vertically oriented pipes. The vertically oriented pipes prevent accumulation of gas bubbles at the top of horizontally oriented pipes that are very close or touching each other. If a reaction should occur within these bubbles, there is very little liquid around each bubble to permit cooling the bubbles. This could lead to an uncontrolled temperature rise with possible explosive results. Gas bubbles could also rise in vertical pipes, but the selected liquid velocity is sufficiently high so that the bubbles move continuously forward with flowing liquid medium.

It has also been found that it is advantageous to continuously cool the entire reaction zone throughout the duration of the reaction. In still a further improvement, it has been found that the step of separating unreacted gases from the aqueous reaction medium can be carried out by introducing air into the unreacted gases, rather than nitrogen, and thereby achieving greater economies of operation.

The present invention has the advantage of avoiding a continuous gas phase between the hydrogen and oxygen and having full utilization of the entire volume of the reactor. The production of hydrogen peroxide occurs in the liquid phase between the dissolved hydrogen gas and oxygen in the presence of a catalyst. The method prevents an explosive reaction from expanding, thereby allowing the concentration of unreacted hydrogen and oxygen to be within the explosive range.

The invention will be more fully described by reference to the following drawing.

DETAILED DESCRIPTION OF THE INVENTION

Figure 1:
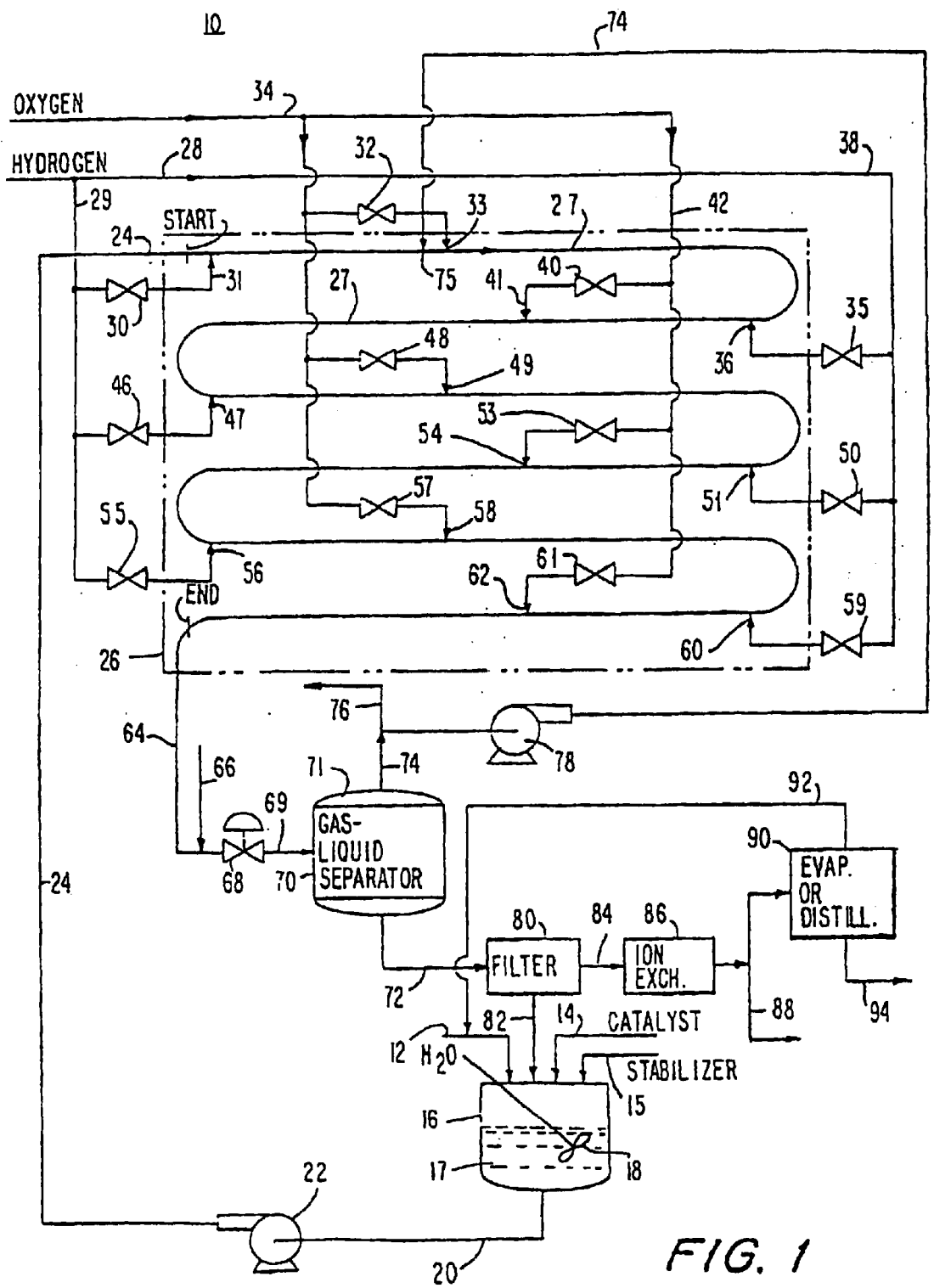
FIG. 1 is a schematic diagram of an apparatus for continuously producing hydrogen peroxide from hydrogen and oxygen according to an embodiment of the invention.

FIG. 1 illustrates a schematic view of the apparatus 10 for producing hydrogen peroxide from hydrogen and oxygen. Water 12 and catalyst 14 are added to tank 16. Catalyst 14 is preferably a supported Group VIII metal catalyst. Preferably, catalyst 14 is palladium or platinum or mixtures thereof. Examples of a support useful for supporting the catalyst in a dispersed fashion are carbon, silica and alumina. It will be appreciated that other catalysts known in the art of hydrogen peroxide production can be used in the present invention.

Preferably, an amount of hydrogen peroxide stabilizer 15 is added to tank 16. Stabilizer 15 can be an acidic solution having a pH in the range of about 1 to 7, preferably in the range of 1–3. Examples of acids useful for the present invention are hydrochloric, phosphoric, hydrobromic and other commercially available inorganic acids. Typically, the amount of stabilizer 15 added to water is less than about 1% of the reaction medium. Solution 17 within tank 16 can be stirred with an automatic or manual agitation means 18.

Solution stream 20 is circulated with recirculating pump 22 as input stream 24. Liquid stream 24 is received at pipeline reactor 26 and fills pipes 27 of pipeline reactor 26. Liquid stream 24 has a flow velocity of greater than 10 feet per second for avoiding the presence of a continuous gas phase or elongated bubbles within reactor 26. It is known that dispersed bubble regime occurs when water has a velocity of greater that 10 feet per second. "The Flow of Complex Mixtures of Pipes." G. W. Govier, Robert Kreiger Publishing Company, Malaber, Fla., page 523. Preferably, the flow velocity of liquid stream 24 is in the range of more than 10 feet per second to about 50 feet per second. Most preferably, the flow velocity of liquid stream 24 is in the range of about 11 to about 20 feet per second. At higher velocities the pressure drop through the pipe becomes too great and catalyst is lost through attrition.

Pipeline reactor 26 is preferably formed of a plurality of pipes 27 joined with a 180° bend. Joined pipes 27 can be arranged either vertically or horizontally. It has been found that significant advantages are achieved where the reactor pipes are vertically oriented. This avoids accumulation of gas bubbles in the area at the top of horizontally oriented pipes. The gas bubbles remain uniformly distributed in a vertical pipe, each surrounded by enough liquid to be cooled as the reaction occurs. Use of vertical pipes also avoids the necessity of installing baffling within horizontal pipes to keep the gas liquid mixture fully mixed.

The length and diameter 27 of pipes are predetermined for providing the desired flow velocity. Preferably, pipes 27 are formed of a commercially available heavy wall pipe such as a U.S. schedule 80 or 160 which has a wall thickness from 0.147 to 1.125 inches over the size range of ½ to 10 inches. Pipes 27 useful for practice of the invention can have diameters in the range of ½ inch to at least 10 inches. The preferred length of pipeline reactor 26 can vary widely depending on the number of joined pipes 27 used in the reactor. Typically, joined pipes 27 have a total length in the range of about 50 to about 60,000 feet. Preferably, joined pipes 27 have a length of about 1,000 to about 20,000 feet.

It will be appreciated that the number of pipes 27 used in pipeline reactor 26 can be varied to change the number of injection points or passes in the pipeline reactor 26. Preferably, the number of passes of pipeline reactor 26 is between about six and about 48 passes.

The pipeline reactor 26 operates at a pressure in the range of about between 30 to about 300 atm. The pressure is desirably above 1200 psi (approximately 80 atm.), preferably is above 1500 psi and most advantageously is in the range of 2000 to 5000 psi. Another advantage of higher pressure is that the higher the pressure, the greater the solubility of hydrogen in solution.

The reaction temperature normally is in the range of 0° C. to 60° C. The lower the temperature of the aqueous medium the higher the solubility of hydrogen is in solution. The reaction temperature can be maintained by providing jacketing on each pipe 27 or by installing the entire pipeline reactor 26 within a vessel in which a refrigerant is being evaporated or cold liquid solution is circulated. It has been found that best results can be obtained if the entire pipeline reactor is substantially continuously cooled during operation.

It has been found that it is critical to maintain the ratio of the volumetric flows of the aqueous reaction medium and the aggregate flows of the gaseous hydrogen and oxygen at a level which ensures that the system remains within the bubbly flow regime. The choice of volumetric flow ratio is within the skill of the reactor operator. Advantages in productivity are achieved by operating at lower L/G ratios. However, where that ratio is too low, the system will not be in a dispersed bubbly flow regime, leading to the possibility of an explosive condition occurring. By increasing the reaction system pressure, it is possible to produce more hydrogen peroxide per unit time in a reactor of given volume. If the flow ratios are maintained within the range of 300–25, and desirably at the lower end of that range, and the velocity of the flowing liquid is maintained at above 10 feet per second, as described above, a regime of tiny bubbles is surrounded by adequate aqueous medium. This assures that the bubbles never overheat and/or coalesce leading to the risk of runaway explosion. statistically, the local increase of the temperature due to the reaction of hydrogen and oxygen bubbles to form water is desirably less than 3° C. This is achieved with the volumetric flow rates and velocities of the invention.

A gaseous stream of hydrogen 28 is injected by valve 30 into a flowing liquid stream 24 at point 31. Liquid stream 24 flows between points 31 and 33 of pipe 27. Hydrogen is dissolved in a liquid stream 24. A gaseous stream of oxygen 34 is injected by valve 32 into liquid stream 24 at point 33. Within pipeline reactor 26, the dissolved hydrogen 28 reacts with the gaseous oxygen 34 to form hydrogen peroxide in solution.

Preferably, gaseous hydrogen 28 and gaseous oxygen 34 are sparged into liquid stream 24 by a small diameter nozzle for producing a plurality of minute bubbles. Preferably, the nozzle has a diameter in the range of about 0.01 inches to about 0.50 inches to produce fine bubbles which are surrounded by rapidly flowing liquid stream 24. The minute bubbles of hydrogen and oxygen are of a size which is small enough to be surrounded by flowing liquid stream 24. The volume of liquid stream is sufficiently large and continuous so that in the event of any explosion of a single bubble the surrounding liquid can expeditiously quench the explosion within the bubble to prevent the propagation of the explosion throughout the entire regime of the reactor. The flow rate of liquid stream 24 and the injection of minute bubbles provide a dispersed bubbly regime in liquid stream 24.

Additional gaseous hydrogen 28 can be injected at a plurality of passes through pipeline reactor 26 with respective valves 35, 46, 50, 55 and 59 at points 36, 47, 51, 56 and 60 for dissolution into liquid stream 24. Additional gaseous oxygen 34 can be injected downstream of hydrogen injection points 36, 47, 51, 56 and 60 with respective valves 40, 48, 53, 57 and 61 at respective points 41, 49, 54, 58 and 62 for reacting with the dissolved hydrogen.

Desirably, the point of oxygen introduction is sufficiently distanced from that of hydrogen injection to permit the hydrogen to have become distributed throughout the aqueous medium as tiny dispersed bubbles and to permit a major portion of it to dissolve in the aqueous medium. Desirably, the second volume of hydrogen and subsequent volumes of hydrogen introduced along the elongated reaction zone are introduced after about 50% of the previously introduced hydrogen has been reacted with oxygen and preferably after at least 75% of the previously introduced hydrogen has been reacted.

After the multi-pass reaction, stream 64 flows from pipeline reactor 26. In the event the off-gas from the reactor is in the flammable range, a diluent gas 66 can be added to stream 64. An example of a diluent gas useful for practice of the invention is nitrogen. It has been found that air can be used in place of nitrogen. While calculations with respect to the mixture in the reactor vent must be made, it is possible to achieve substantial economies by using air as the inerting gas rather than pure nitrogen.

A pressure letdown valve 68 can be used before gas-liquid separator 70 for reducing the pressure of the inlet mixture 69 to gas-liquid separator 70. Gas liquid separator 70 separates liquid 72 from gas 74. Gas 74 containing unreacted oxygen, possibly nitrogen and some unreacted hydrogen from separator 70 can be recycled with recycled gas compressor 78 and can be injected at point 75 into liquid stream 24. This provides for safer operation as discussed above. Alternatively, separated gas 74 can be purged with valve 76. It will be appreciated that a gas liquid separator useful for practice of the invention is known in the art. Stream 72 can be received at additional pipeline reactors 26 for connecting the reactors in series before gas liquid separator 70.

Separated liquid 72 containing the hydrogen peroxide product in the aqueous solution of catalyst and acid is passed to a filter 80 for recovering the catalyst as filter cake 82 or the catalyst may be recovered in a centrifuge or cyclone. Filter cake 82 can be added to tank 16 for recycling the catalyst. Filtrate 84 includes the hydrogen peroxide product and the aqueous acid water solution. Filtrate 84 is received at ion exchange apparatus 86 for removing the acid from the filtrate.

Hydrogen peroxide product 88 from ion exchange apparatus 86 can be directly used as a hydrogen peroxide product. Alternatively, hydrogen peroxide product 88 can be received at column 90 for concentrating the hydrogen peroxide product 88 in order to produce a concentrated hydrogen peroxide product 94. Column 90 can be an evaporation or distillation column. Water 92 removed from column 90 can be recycled into water stream 12 as make-up water.

The concentration of hydrogen peroxide product 82 produced by pipeline reactor 26 depends on the number of injections of hydrogen and oxygen in the passes of pipeline reactor 26. Preferably, hydrogen peroxide product 82 has a concentration in the range of about 1% to about 30% of hydrogen peroxide in solution. Preferably, hydrogen peroxide product 94 has up to 70% concentration.

The invention has the advantage of providing an economical and safe process for producing hydrogen peroxide. The process does not specifically inject an inert gas or chemical agent within the reactor, thereby reducing costs. The entire regime of the pipeline reactor comprises a dispersed bubbly regime in a rapidly flowing liquid stream for preventing the formation of an explosive gas phase with the reactor. The entire pipeline is utilized for the production of the hydrogen peroxide. In addition, the high surface to volume relationship of the reactor provides inexpensive removal of heat from the reactor.

EXAMPLE I

Continuous Process

A circulating aqueous stream of a suspended group VIII metal catalyst deposited on an inert carrier with an acid stabilizer is delivered at a pressure of 200 atmospheres (3000 psi) to the first of two tubular reactors operated in series at a flow rate of 195,000 pounds per hour per reactor in the reactor shown in FIG. 1. The reactor consists of 4" schedule 160 pipes 100 feet long, each connected together by 180° U bends. The liquid flow rate has a liquid velocity of 13 feet/second. The liquid stream is introduced into the reactor at 15° C.

At the reactor inlet 27.2 pounds per hour of hydrogen gas is injected through a nozzle to form fine individual bubbles in the liquid stream flowing at 13 feet/second. This produces a bubbly flow regime with a continuous liquid phase and small evenly dispersed individual bubbles. Recycled gas from the gas-liquid separator can be injected into the process fluid. This is followed by the injection of 432 lbs/hr. of oxygen as finely dispersed bubbles which reacts with the hydrogen to form hydrogen peroxide. This is followed by repeated injections for each reactor of first hydrogen and then oxygen to form hydrogen peroxide of increasing concentration. The heat of reaction is removed by the circulation of cooled water (or refrigerant) outside the reactor pipes.

After passing through the second reactor, the effluent flows through a pressure letdown valve before a gas-liquid separator. Nitrogen or other diluent gas is added to the reactor effluent as needed to assure that the exit gas from the separator is outside the explosive/flammable limits of hydrogen and oxygen. This gas can be either recycled to the first reactor or vented to atmosphere.

The liquid phase is filtered to remove the suspended catalyst slurry so that it can be resuspended in the aqueous medium. This is done in a mix tank where the concentration of each ingredient is checked and adjusted as needed. This includes the acid used as a stabilizer for hydrogen peroxide. The filtrate from the filter that contains the desired hydrogen peroxide product passes over an ion exchange or equal agent to remove residual acid values from the hydrogen peroxide product. This product can then be used directly or can be concentrated in an evaporator or distillation column to concentrations up to 70% following conventional practices. A total production of 100,000,000 pounds per year of hydrogen peroxide can be produced from these two reactors.

EXAMPLE II

Batch Semicontinuous Process

Figure 2:
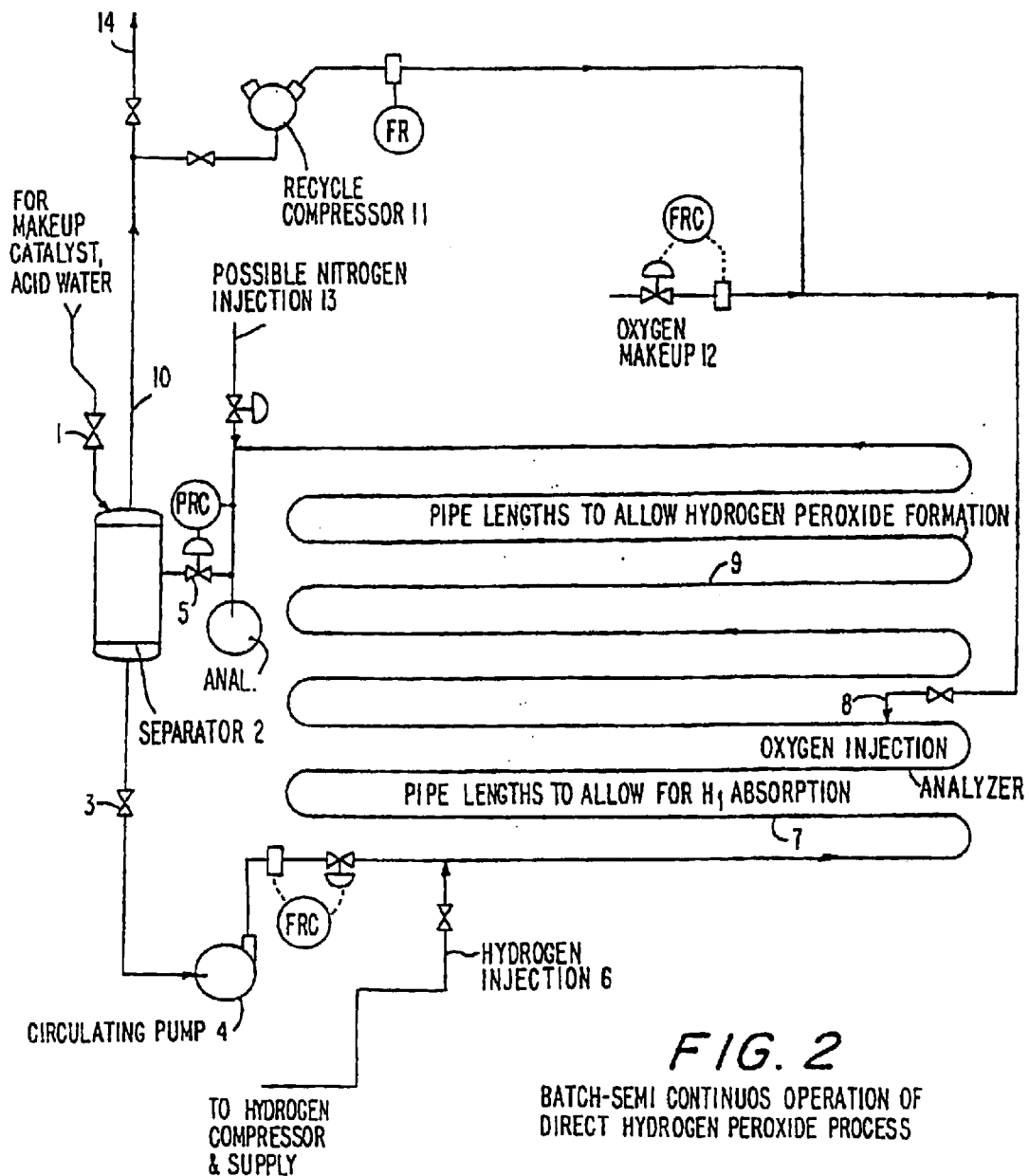
FIG. 2 is a schematic diagram of an apparatus for producing hydrogen peroxide in a semicontinuous batch process according to a second embodiment of the invention.

FIG. 2 illustrates an alternate method of operating the process of the invention in a batch, semicontinuous fashion. A fresh batch of reaction medium consisting of a group VIII metal catalyst on an inert support in an acidic aqueous solution, is charged through valve 1 to separator 2. The solution is charged to the reactor via valve 3 and recirculating pump 4. Once the system is filled, flow of fresh solution is stopped by closing valve 1. The pressure in the system is increased by closing valve 5.

The velocity of the medium is maintained at 10 feet per second or more. Recycle gas is injected before the hydrogen at point 12. Hydrogen is injected at injection system 6. The amount of hydrogen introduced is at or less than the solubility limit in the flowing medium. Oxygen is introduced at point 8, at a sufficient distance downstream (pipe length 7) to ensure the absorption of the bulk of the hydrogen. At full capacity, hydrogen flow is about 15 pounds per hour and oxygen flow is approximately 250 pounds per hour. Sufficient pipe length 9 is provided downstream of the oxygen injection to permit the maximum conversion to hydrogen peroxide. The pipeline is cooled by a coolant on the outside of the pipe to maintain an operating temperature between 5 and 30° C.

The reactor effluent passes to separator 2 to disengage the gas 10 from the liquid. If the exit gas is in the flammable region, either air or nitrogen is injected before the separator. This gas stream can be recycled back to the reactor. If the exit gas is in flammable region, nitrogen 13 is injected into the effluent stream.

Pump 4 recirculates the liquid medium until the hydrogen peroxide reaches its desired concentration, desirably between 4–15% by weight, preferably 5–8%. Gas injection will continue for from one to three hours. The reactor system, including the separator, pump and piping is then drained. The system is then refilled with a fresh reactor charge following the procedure outlined above. This batch semicontinuous procedure produces from 1,000,000–1,500,000 pounds per year of hydrogen peroxide product. With smaller or larger diameter pipe of the same length, lower or higher quantities, respectively, of hydrogen peroxide are produced.

EXAMPLE III

First Modified Batch Semicontinuous Process

The batch semicontinuous process described in Example II can be carried out in a modified way to reduce both the capital costs and operating costs of the reaction system. The basic flow diagram of FIG. 2 is used with the exception that a second reaction medium pump is provided in parallel with charge pump 4 in order to recirculate the reactor contents at pressure. This latter feature is accomplished by relocating the pressure let down valve 5 from the effluent line from the reactor before the separator to the downstream gas effluent line from the separator 2.

In operation, the operating pressure in the separator remains high (1,000–4,000 psi) throughout the course of the reaction. Pressure is maintained by "head" gas above the separator liquid. The gas to be recycled enters recycle compressor upstream of the pressure letdown valve. The exit gas in line 10 passes through a pressure letdown valve. By configuring the process in this way, any residual dissolved gas in the reactor effluent stays in solution while passing through the separator because the latter remains at pressure. Thus, it is not necessary to redissolve gases in the recirculating reactor effluent and both the separated liquid and unreacted gas need not be repressurized as in Example II. Configuring the process thusly should reduce the capital and operating costs of the recirculating pump, the recycle compressor, the separator and other parts of the process.

EXAMPLE IV

First Modified Continuous Process

A recirculating aqueous stream of a suspended group VIII metal catalyst deposited on an inert carrier with an acid stabilizer is delivered to the first of two tubular reactors operated in series in the reactor shown in FIG. 1. The reactor consists of vertically oriented 4" schedule 160 pipes 100 feet long, each connected together by 180° U bends. The liquid stream is introduced into the reactor at 15° C.

At the reactor inlet hydrogen gas is injected through a nozzle to form fine individual bubbles in the liquid stream. This produces a bubbly flow regime with a continuous liquid phase and small evenly dispersed individual bubbles. Recycled gas from the gas-liquid separator is injected into the process fluid. This is followed by the injection of oxygen as finely dispersed bubbles which reacts with the hydrogen to form hydrogen peroxide. This is followed by repeated injections for each reactor of first hydrogen and then oxygen to form hydrogen peroxide of increasing concentration. The ratio of the volume of liquid medium to the aggregate volume of hydrogen and oxygen gas may be low but not below the value at which the process is no longer in the bubbly flow regime. The heat of reaction is removed by the circulation of cooled water (or refrigerant) outside the reactor pipes.

After passing through the second reactor, the effluent flows through a pressure letdown valve before a gas-liquid separator. Air is added to the reactor effluent as needed to assure that the exit gas from the separator is outside the explosive/flammable limits of hydrogen and oxygen. The bulk of this gas can be either recycled to the first reactor or vented to atmosphere.

The liquid phase is filtered to remove the suspended catalyst slurry so that it can be resuspended in the aqueous medium. This is done in a mix tank where the concentration of each ingredient is checked and adjusted as needed. This includes the acid used as a stabilizer for hydrogen peroxide. The filtrate from the filter that contains the desired hydrogen peroxide product passes over an ion exchange or equal agent to remove residual acid values from the hydrogen peroxide product. This product can then be used directly or can be concentrated in an evaporator or distillation column to concentrations up to 70% following conventional practice. A total production of 100,000,000 pounds per year of hydrogen peroxide can be produced from these two reactors.

While the invention has been described with reference to the preferred embodiment, this description is not intended to be limiting. It will be appreciated by those of ordinary skill in the art that modifications may be made without departing from the spirit and scope of the invention.

EXAMPLE V

Second Modified Continuous Process

Figure 3:
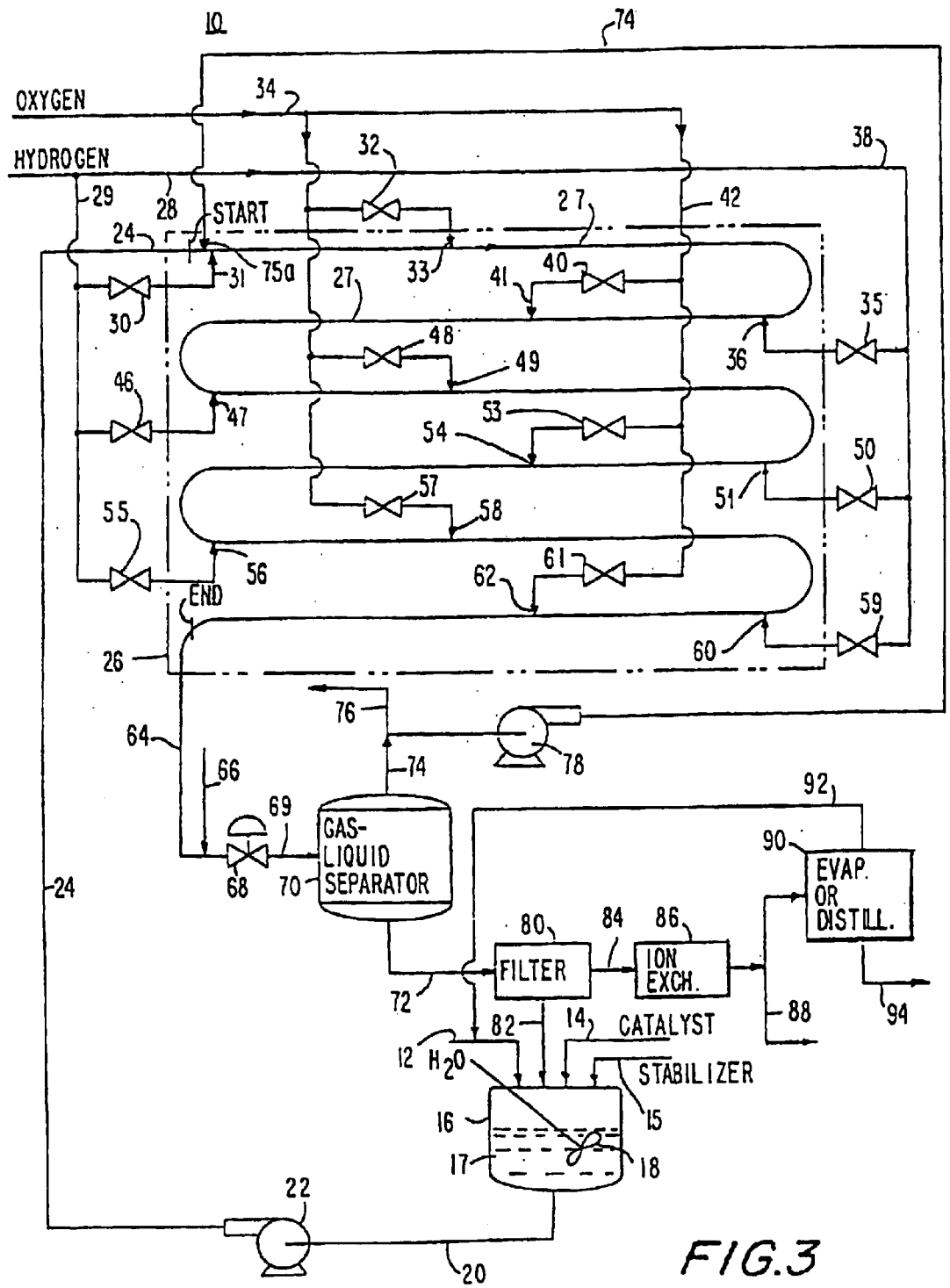
FIG. 3 is a schematic diagram of an apparatus for continuously producing hydrogen peroxide from hydrogen and oxygen according to a third embodiment of the invention.

The process carried out in the reactor system shown in FIG. 3 makes hydrogen peroxide in high yields. The reactor shown in FIG. 3 is identical to the reactor shown in FIG. 1, with the following exceptions: In FIG. 1 the addition of recycle gas is at inlet 75, downstream of the first hydrogen inlet and upstream of the first oxygen inlet. In FIG. 3 the addition of recycle gas is at 75a, upstream of the first hydrogen inlet.

EXAMPLE VI

Second Modified Batch Semicontinuous Process

Figure 4:
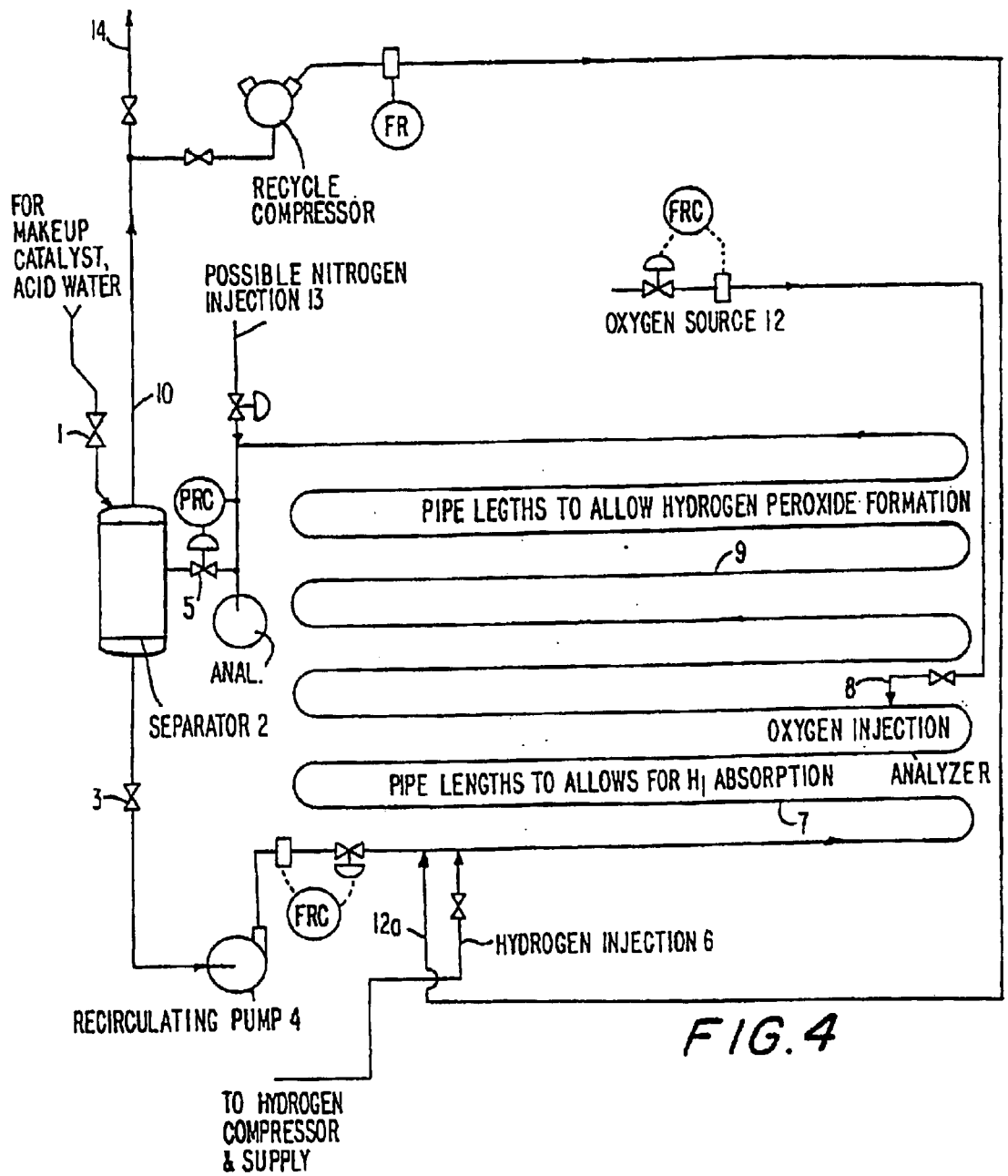
FIG. 4 is a schematic diagram of an apparatus for producing hydrogen peroxide in a semicontinuous batch process according to a fourth embodiment of the invention.

The process carried out in accordance with the reactor system shown in FIG. 4 makes hydrogen peroxide in high yields. The reactor is identical to the reactor shown in FIG. 2, with the following exceptions: In FIG. 2 recycle gas is added into the oxygen supply at inlet 12, forming an oxygen/recycle gas stream. This stream was added to the liquid reactor flow at an inlet downstream of the hydrogen inlet. In FIG. 4 the addition of the recycle gas is at 12a. The recycle gas is not combined with oxygen upstream of the hydrogen inlet.

What is claimed is:

1. A process for preparing hydrogen peroxide by reaction of hydrogen and oxygen in the presence of a catalyst, comprising:

(a) establishing a continuous flow path of an aqueous reaction medium containing the catalyst for the reaction in a reaction zone; and (b) introducing oxygen and hydrogen into the continuous flow of aqueous reaction medium to form hydrogen peroxide within the aqueous reaction medium, the hydrogen and oxygen being introduced in sufficient amounts and at selected points distanced from one another along the continuous flow path of the aqueous reaction medium such that dispersed bubbles of hydrogen and oxygen are formed within the continuously flowing aqueous reaction medium and are sufficiently sized and spaced to prevent the presence of a continuous gas phase within the reaction zone.

2. The process of claim 1, wherein a plurality of streams of essentially hydrogen are introduced into the continuous flow of aqueous medium.

3. The process of claim 2, wherein a plurality of streams of essentially oxygen are introduced into the continuous flow of aqueous medium.

4. The process of claim 1, further comprising:

(c) at a location downstream from the reaction zone, introducing the aqueous reaction medium including hydrogen peroxide into a gas-liquid separator to separate unreacted gases from the aqueous reaction medium including hydrogen peroxide; and (d) recovering hydrogen peroxide from the aqueous reaction medium.

5. The process of claim 4, further comprising:

(e) recycling the unreacted gases separated from the aqueous reaction medium to the reaction zone at a location upstream from locations at which hydrogen and oxygen are introduced into the continuous flow of aqueous reaction medium.

6. The process of claim 4, further comprising:

(e) adding air to the unreacted gases separated from the aqueous reaction medium so as to render the unreacted gases inert.

7. The process of claim 1, further comprising:

(c) cooling the continuous flow of aqueous reaction medium in the reaction zone.

8. The process of claim 1, wherein a stream of essentially oxygen is introduced into the aqueous reaction medium after a stream of essentially hydrogen has been introduced into the aqueous reaction medium.

9. The process of claim 1, wherein the introduction of oxygen and hydrogen into the continuous flow of aqueous reaction medium includes injecting a first volume of essentially hydrogen into the aqueous reaction medium, injecting a first volume of essentially oxygen into the aqueous reaction medium downstream from the first volume of essentially hydrogen, and injecting a second volume of essentially hydrogen into the aqueous reaction medium downstream from the first volume of essentially oxygen, the second volume of essentially hydrogen being introduced into the aqueous reaction medium after at least 50% of hydrogen in the aqueous reaction medium has reacted with oxygen.

10. The process of claim 1, wherein at least 75% of the hydrogen introduced into the continuous flow of aqueous medium reacts with oxygen within the reaction zone.

11. The process of claim 1, wherein the reaction is carried out in a batch semicontinuous manner.

12. The process of claim 1, wherein the reaction zone includes a plurality of vertically oriented pipes.

* * * * *